(12) United States Patent
Yen et al.

(10) Patent No.: US 10,158,273 B2
(45) Date of Patent: Dec. 18, 2018

(54) LIQUID-COOLED MOTOR DEVICE

(71) Applicant: Chien-Kuo Yen, Taipei (TW)

(72) Inventors: Chien-Kuo Yen, Taipei (TW);
Chun-Tun Yu, Miaoli County (TW)

(73) Assignee: Chien-Kuo Yen, Taipei (TW)

( * ) Notice: Subject to any disclaimer, the term of this patent is extended or adjusted under 35 U.S.C. 154(b) by 343 days.

(21) Appl. No.: 15/146,606

(22) Filed: May 4, 2016

(65) Prior Publication Data
US 2016/0329779 A1    Nov. 10, 2016

(30) Foreign Application Priority Data

May 7, 2015  (TW) .............................. 104114587 A (51) Int. Cl.
| H02K 9/18 | (2006.01) |
|---|---|
| H02K 9/193 | (2006.01) |
| H02K 5/20 | (2006.01) |

(52) U.S. Cl.
CPC .............. H02K 9/193 (2013.01); H02K 5/20 (2013.01)

(58) Field of Classification Search
CPC .. H02K 9/00; H02K 9/02; H02K 9/06; H02K 9/08; H02K 9/10; H02K 9/12; H02K 9/14; H02K 9/18; H02K 9/193; H02K 5/18; H02K 5/20; H02K 7/00; H02K 7/006; H02K 7/1004; H02K 7/14
See application file for complete search history.

(56) References Cited

U.S. PATENT DOCUMENTS

| 5,214,325 A * | 5/1993 | Matson | .................... H02K 9/06 310/58 |
| 5,655,485 A | 8/1997 | Kusase et al. | |
| 5,857,348 A * | 1/1999 | Conry | .................... F04D 25/06 417/423.12 |
| 6,182,617 B1 * | 2/2001 | Bigcharles | .............. F01P 7/167 123/41.05 |
| 6,657,332 B2 * | 12/2003 | Balas | ........................ F02C 7/08 310/58 |

(Continued)

FOREIGN PATENT DOCUMENTS

| TW | 563287 | 11/2003 |
| TW | M412549 | 9/2011 |

OTHER PUBLICATIONS

Search Report for TW104114587, dated Jun. 1, 2016, 2 pages including English translation.

*Primary Examiner* — Tran Nguyen
(74) *Attorney, Agent, or Firm* — Hamre, Schumann, Mueller & Larson, P.C.

(57) ABSTRACT

A liquid-cooled motor device includes a motor casing, a motor, a coolant casing and an impeller. The motor casing receives the motor, and defines a cooling space surrounding the retaining space, a coolant intake hole, and a coolant draining hole. The coolant casing defines a drawing space, a coolant inlet and a coolant outlet. The impeller is disposed in the drawing space and connected to an output shaft of the motor, and is rotated by the output shaft to draw a coolant into the drawing space via the coolant inlet, and to force the coolant into the cooling space via the coolant outlet and the coolant intake hole, such that the coolant removes heat generated by the motor, and is expelled from the cooling space via the coolant draining hole.

7 Claims, 6 Drawing Sheets

(56) References Cited

U.S. PATENT DOCUMENTS

| | | | |
|---|---|---|---|
| 6,891,290 B2* | 5/2005 | Nagayama | H02K 1/32 310/58 |
| 7,704,056 B2* | 4/2010 | Masoudipour | F04D 17/122 417/367 |
| 8,536,744 B2* | 9/2013 | Nagayama | H02K 1/20 310/58 |
| 2013/0119796 A1* | 5/2013 | Maeda | H02K 9/06 310/63 |

* cited by examiner

LIQUID-COOLED MOTOR DEVICE

CROSS-REFERENCE TO RELATED APPLICATION

This application claims priority of Taiwanese Patent Application No. 104114587, filed on May 7, 2015.

FIELD

The disclosure relates to a motor device, and more particularly to a liquid-cooled motor device.

BACKGROUND

Figure 1:
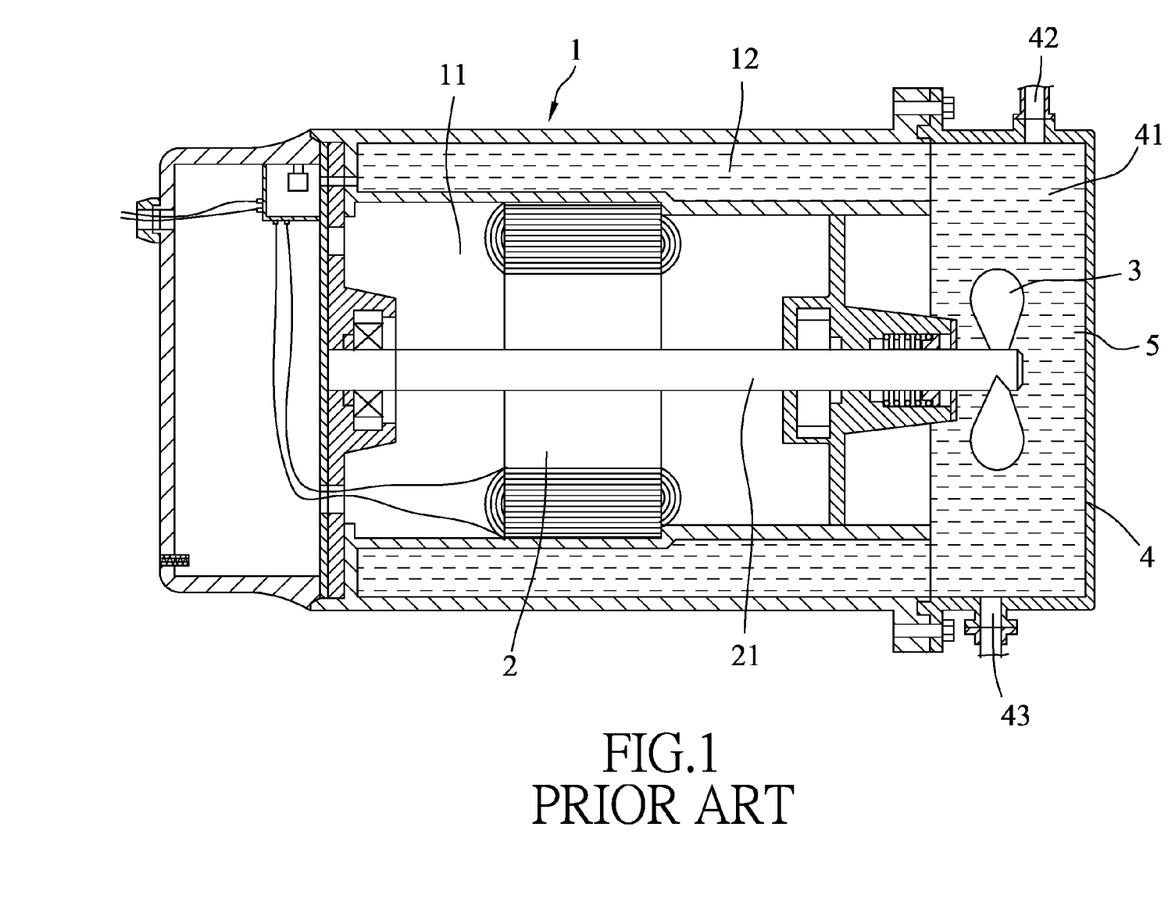
FIG. 1 is a sectional view of a conventional liquid-cooled motor device disclosed in Taiwanese Patent Publication No. 169775.

Referring to FIG. 1, Taiwanese Patent Publication No. 169775 discloses a conventional liquid-cooled motor device including a motor casing 1, a motor 2, an impeller 3 and a coolant casing 4.

The motor casing 1 defines a retaining space 11, and a cooling space 12 surrounding the retaining space 11. The motor 2 is disposed in the retaining space 11, and includes a rotatable output shaft 21. The impeller 3 is co-rotatably mounted to the output shaft 21 of the motor 2. The coolant casing 4 is connected to an end of the motor casing 1, and defines a coolant space 41 that is in fluid communication with the cooling space 12 and that receives the impeller 3 therein, a coolant inlet 42 that is in fluid communication with the coolant space 41, and a coolant outlet 43 that is in fluid communication with the coolant space 41.

When the conventional liquid-cooled motor device is in use (i.e., the motor 2 is in operation), a coolant 5 flows into the coolant space 41 and the cooling space 12 via the coolant inlet 42 for removing heat generated by the motor 2, and exits the coolant space 41 and the coding space 12 via the coolant cutlet 43. The impeller 3 is rotated by the output shaft 21 of the motor 2 to force the flow of the coolant 5.

However, since both of the coolant inlet 42 and the coolant outlet 43 are formed in the coolant casing 4, the coolant 5 flowing into the coolant space 41 via the coolant inlet 42 would hardly flow to an end of the cooling space 12 distal from the coolant casing 4 before the coolant 5 flows out of the coolant space 41 via the coolant outlet 43. Thus, the motor 2 may not be efficiently cooled down. Moreover, the impeller 3 may force the coolant 5 flowing into the coolant space 41 via the coolant inlet 42 to flow out of the coolant space 41 via the coolant outlet 43 without flowing through the cooling space 12.

SUMMARY

Therefore, an object of the disclosure is to provide a liquid-cooled motor device that can alleviate at least one of the drawbacks of the prior art.

According to the disclosure, the liquid-cooled motor device includes a motor casing, a motor, a coolant casing and an impeller. The motor casing defines a retaining space, a cooling space that surrounds the retailing space, a coolant intake hole that is in fluid communication with the cooling space, and a coolant draining hole that is in fluid communication with the cooling space. The motor is disposed in the retaining space, and has a rotatable output shaft. The coolant casing is mounted to an outer surface of the motor casing, and defines a drawing space, a coolant inlet that is in fluid communication with the drawing space, and a coolant outlet that is in fluid communication with the drawing space and the coolant intake hole. The impeller is co-rotatably connected to an end of the output shaft of the motor, and is disposed in the drawing space of the coolant casing. The impeller is rotated by the output shaft to draw a coolant into the drawing space via the coolant inlet, and to force the coolant to flow into the cooling space via the coolant outlet and the coolant intake hole, such that the coolant removes heat generated by the motor, and is expelled from the cooling space via the coolant draining hole.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 2:
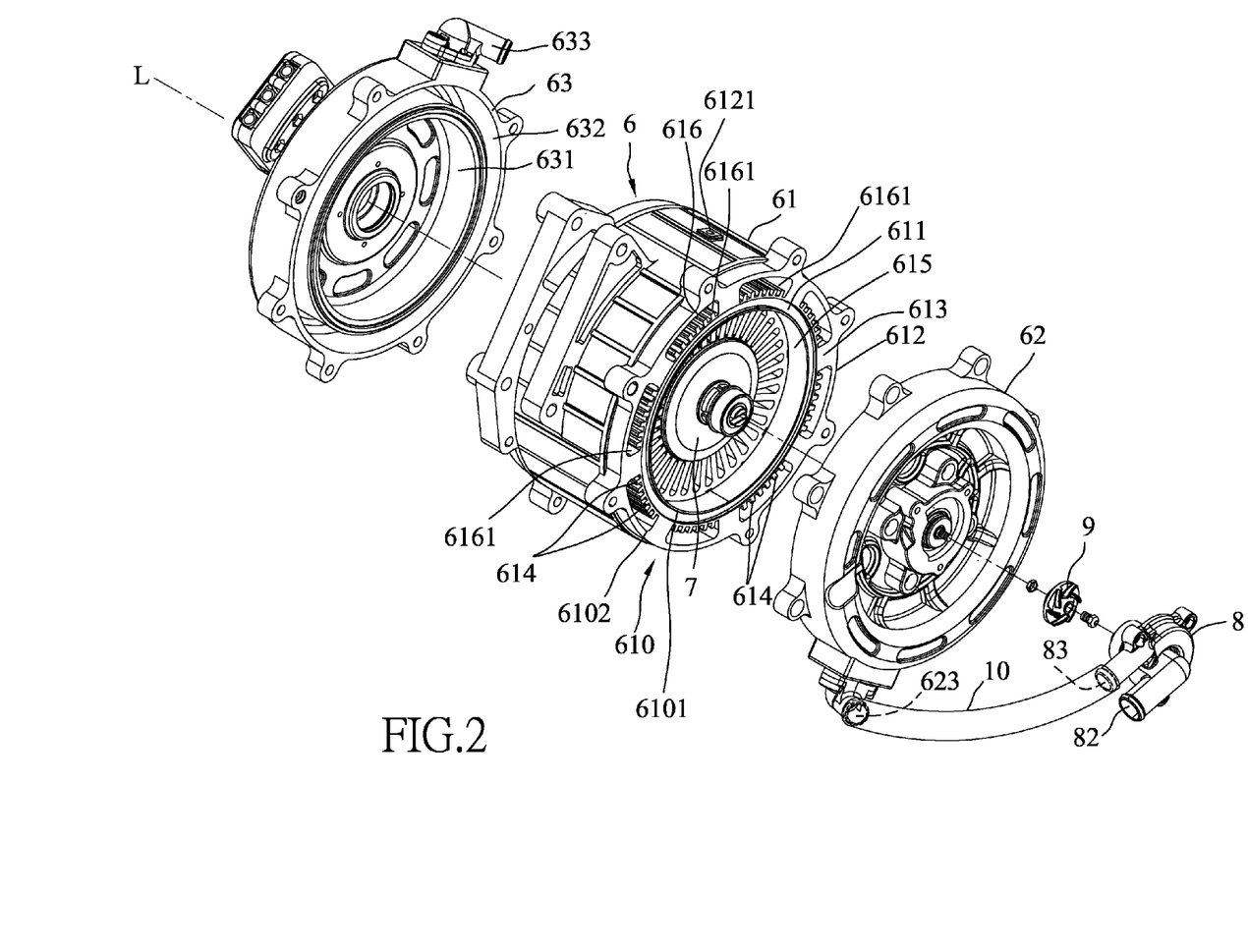
FIG. 2 is an exploded perspective view illustrating an embodiment of a liquid-cooled motor device according to the disclosure.
Figure 3:
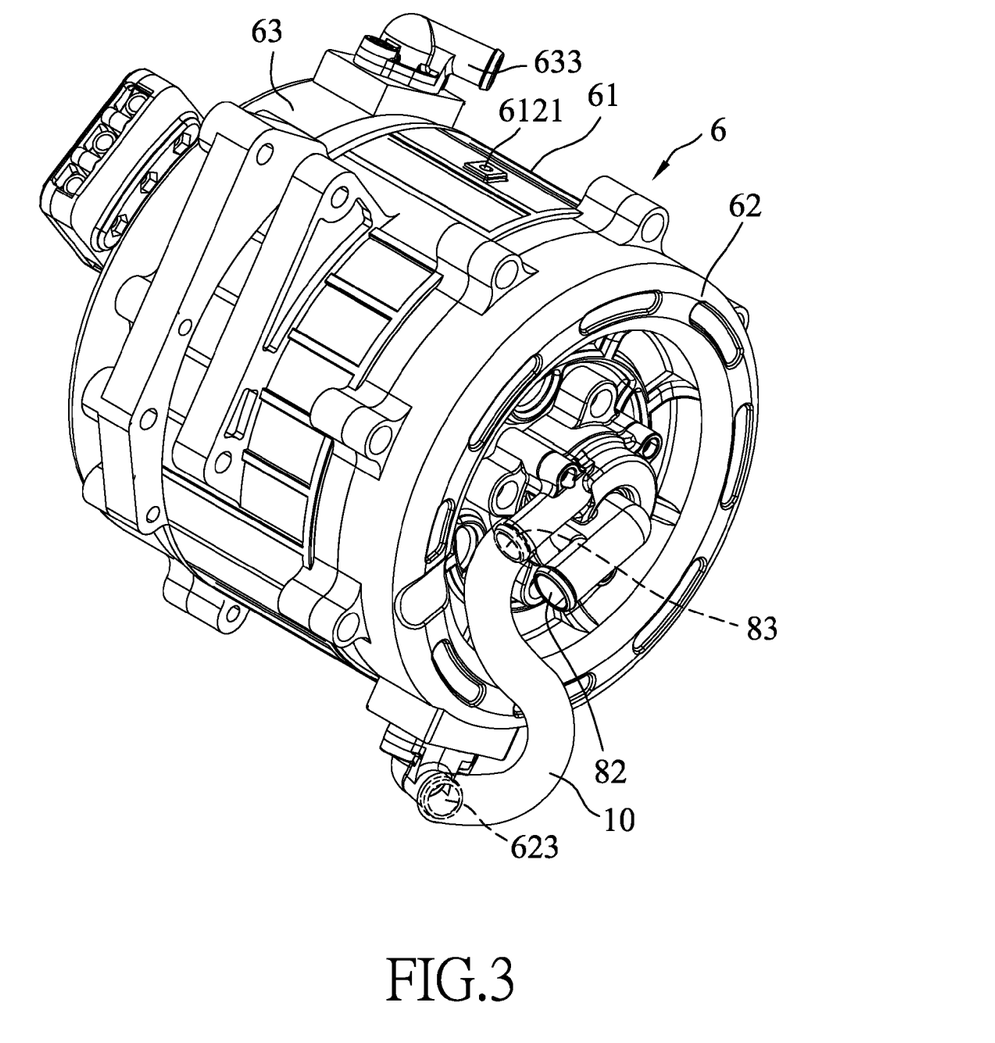
FIG. 3 is a perspective view illustrating the embodiment.
Figure 5:
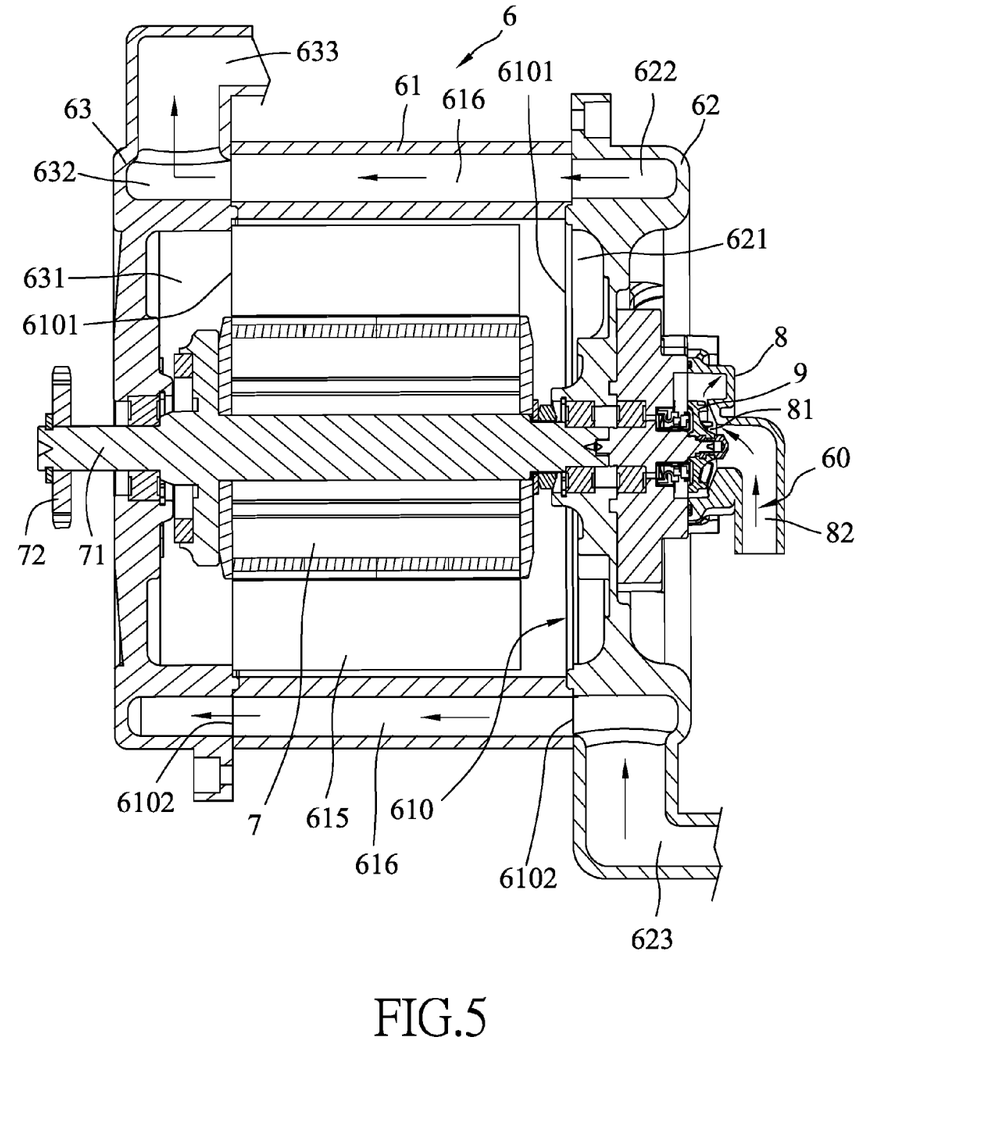
FIG. 5 is a schematic sectional view taken along line V-V in FIG. 4 and illustrating the embodiment.

Referring to FIGS. 2, 3 and 5, the embodiment of the liquid-cooled motor device according to the disclosure is for use in an electric vehicle, such as an electric car, an electric motorcycle or an electric bicycle. The liquid-cooled motor device includes a motor casing 6, a motor 7, a coolant casing 8, an impeller 9 and a connecting member 10.

The motor casing 6 includes a casing body 61, a first cap 62 and a second cap 63.

The casing body 61 has an inner surrounding wall 611, an outer surrounding wall 612, a plurality of connecting walls 613 and a plurality of cooling fin units. The inner surrounding wall 611 surrounds an axis (L) to define a retaining space 615 therein. The retaining space 615 has two opposite open ends 6101 along the axis (L). The outer surrounding wall 612 surrounds the inner surrounding wall 611, and cooperates with the inner surrounding wall 611 to define a cooling space 616 therebetween. The cooling space 616 has two opposite open ends 6102 along the axis (L). The outer surrounding wall 612 is formed with a vent hole 6121. The connecting walls 613 are angularly spaced apart from each other about the axis (L), and are each connected between the inner and outer surrounding walls 611, 612 so as to divide the cooling space 616 into a plurality of cooling space portions 6161. One of the cooling space portions 6161 is in fluid communication with the vent hole 6121. Each of the cooling fin units is disposed in a respective one of the cooling space portions 6161, and includes a plurality of cooling fins 614 each extending from the inner surrounding wall 611 toward the outer surrounding wall 612. Each of the open ends 6101 of the retaining space 615 cooperates with a corresponding one of the open ends 6102 of the cooling space 616 to form an open end 610 of the casing body 61 (i.e., the casing body 61 has two opposite open ends 610 along the axis (L)).

The first cap 62 covers one of the open ends 610 of the casing body 61. The first cap 62 has a first inner space 621 (see FIG. 5) that is in spatial communication with the retaining space 615 of the casing body 61, an annular coolant intake space 622 (see FIG. 5) that surrounds the first inner space 621 and that is in fluid communication with the cooling space 616, and a coolant intake hole 623 that is in fluid communication with the coolant intake space 622.

The second cap 63 covers the other one of the open ends 610 of the casing body 61. The second cap 63 has a second inner space 631 (see FIG. 2) that is in spatial communication with the retaining space 615 of the casing body 61, an annular coolant draining space 632 (see FIG. 2) that surrounds the second inner space 631 and that is in fluid communication with the cooling space 616, and a coolant draining hole 633 that is in fluid communication with the coolant draining space 632. When a coolant 60 is introduced into the cooling space portions 6161, the coolant intake space 622 and the coolant draining space 632, air in the cooling space portions 6161, the coolant intake space 622 and the coolant draining space 632 is expelled via the vent hole 6121. The vent hole 6121 is sealed with a screw (not shown) and a plurality of sealing rings (not shown) after the cooling space portions 6161, the coolant intake space 622 and the coolant draining space 632 are filled with the coolant 60.

The motor 7 is disposed in the retaining space 615, and has a rotatable output shaft 71. An end of the output shaft 71 distal from the first cap 62 is co-rotatably mounted with a transmission member 72 (see FIG. 6). Rotation of the output shaft 71 rotates the transmission member 72 to drive the electric vehicle.

Figure 4:
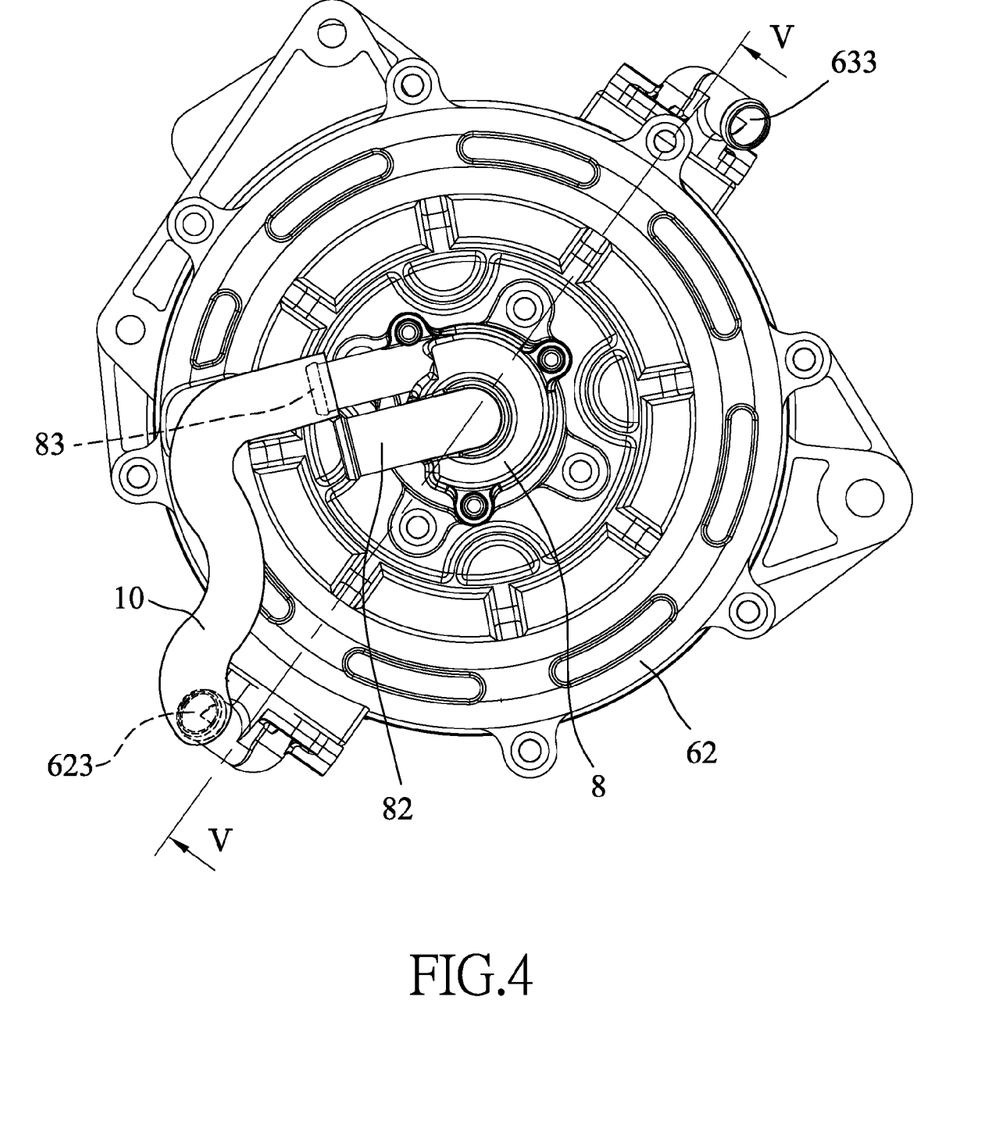
FIG. 4 is a side view illustrating the embodiment.
Figure 6:
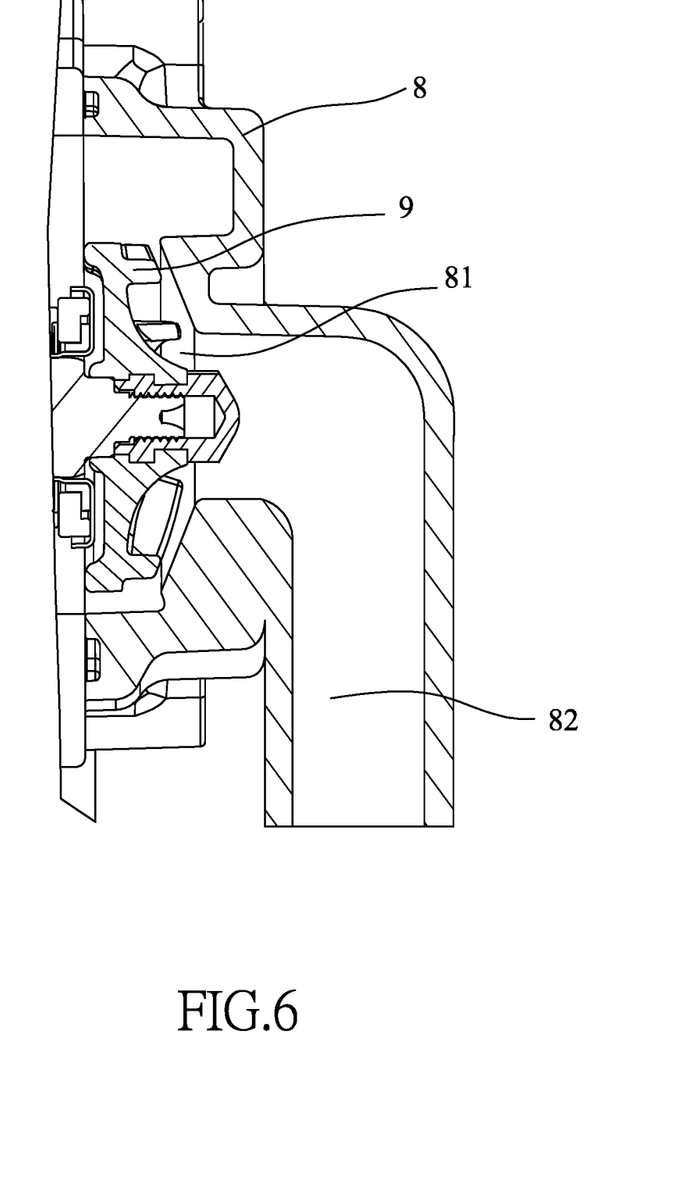
FIG. 6 is a fragmentary sectional view illustrating a coolant casing of the embodiment.

Referring to FIGS. 4 to 6, the coolant casing 8 is separably mounted to an outer surface of the first cap 62, and defines a drawing space 81, a coolant inlet 82 that is in fluid communication with the drawing space 81, and a coolant outlet 83 that is in fluid communication with the drawing space 81.

The impeller 8 is co-rotatably mounted on the other end of the output shaft 71 of the motor 7 opposite to the transmission member 72, and is disposed in the drawing space 81 of the coolant casing 8.

The connecting member 10 fluidly interconnects the coolant intake holes 623 of the first cap 62 and the coolant outlet 83 of the coolant casing 8. In one embodiment, the connecting member 10 may be configured as a steel tube or a plastic tube.

When the motor 7 is in operation, the impeller 9 is rotated by the output shaft 71 to draw the coolant 60 to flow into the drawing space 81 via the coolant inlet 82, and to force the coolant 60 to flow into the coolant intake space 622 via the coolant outlet 83, the connecting member 10 and the coolant, intake hole 623. The coolant 60 flowing into the coolant intake space 622 flows through the cooling space portions 6161 to remove the heat generated by the motor 7, and is gathered at the coolant draining space 632 to be expelled from the motor casing 6 via the coolant draining hole 633.

In summary, since the coolant intake hole 623 and the coolant draining hole 633 are respectively located at the first and second caps 62, 63, the coolant 60 entering the motor casing 6 via the coolant intake hole 623 would certainly flow through the cooling space portions 6161 for cooling the motor 7 before the coolant 60 flows out of the motor casing 6 via the coolant draining hole 633. Moreover, since the drawing space 81, the coolant intake space 622, the cooling space 616 and the coolant draining space 632 are connected in series, the impeller 9 is configured to force the coolant 60 to enter the cooling space 616, and would allow for the removal of heat generated by the motor 7.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment", "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiments but is intended to cover various arrangements included within the spirit and scope of the broadest interpretation so as to encompass all such modifications and equivalent arrangements.

What is claimed is:

1. A liquid-cooled motor device comprising:
    a motor casing defining a retaining space, a cooling space that surrounds said retaining space, a coolant intake hole that is in fluid communication with said cooling space, and a coolant draining hole that is in fluid communication with said cooling space;
    a motor disposed in said retaining space and having a rotatable output shaft;
    a coolant casing mounted to an outer surface of said motor casing, said coolant casing defining a drawing space, a coolant inlet that is in fluid communication with said drawing space, and a coolant outlet that is in fluid communication with said drawing space and said coolant intake hole; and
    an impeller co-rotatably connected to an end of said output shaft of said motor and disposed in said drawing space of said coolant casing, said impeller being rotated by said output shaft to draw a coolant into said drawing space via said coolant inlet, and to force the coolant to flow into said cooling space via said coolant outlet and said coolant intake hole, such that the coolant removes heat generated by said motor and is expelled from said cooling space via said coolant draining hole,
    wherein said motor casing includes a casing body that permits said motor to be disposed therein and that has two opposite open ends, and first and second caps that respectively cover said two opposite open ends of said casing body,
    said casing body has an inner surrounding wall that defines said retaining space therein, an outer surrounding wall that surrounds said inner surrounding wall and that cooperates with said inner surrounding wall to define said cooling space therebetween, and a plurality of cooling fins each extending from said inner surrounding wall toward said outer surrounding wall, and
    said casing body further has a plurality of connecting walls that are angularly spaced apart from each other and that are each connected between said inner and outer surrounding walls so as to divide said cooling space into a plurality of cooling space portions.

2. The liquid-cooled motor device as claimed in claim 1, wherein said coolant intake hole is formed in said first cap, and said coolant draining hole is formed in said second cap.

3. The liquid-cooled motor device as claimed in claim 2, wherein said first cap further has a coolant intake space that is in fluid communication with said cooling space and said coolant intake hole, said second cap further having a coolant draining space that is in fluid communication with said cooling space and said coolant draining hole.

4. The liquid-cooled motor device as claimed in claim 3, wherein said coolant intake space is configured as an annular space, said coolant draining space being configured as an annular space.

5. The liquid-cooled motor device as claimed in claim 1, wherein said coolant casing is separably mounted to an outer surface of said first cap.

6. The liquid-cooled motor device as claimed in claim 5, further comprising a connecting member that fluidly interconnects said coolant intake hole of said motor casing and said coolant outlet of said coolant casing.

7. The liquid-cooled motor device as claimed in claim 1, further comprising a connecting member that fluidly interconnects said coolant intake hole of said motor casing and said coolant outlet of said coolant casing.

\* \* \* \* \*